US009109489B2

(12) United States Patent
Katsuta (10) Patent No.: US 9,109,489 B2
(45) Date of Patent: Aug. 18, 2015

(54) VEHICLE (75) Inventor: Hiroshi Katsuta, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/236,401

(22) PCT Filed: Sep. 1, 2011

(86) PCT No.: PCT/JP2011/069883
§ 371 (c)(1),
(2), (4) Date: Jan. 31, 2014

(87) PCT Pub. No.: WO2013/031002
PCT Pub. Date: Mar. 7, 2013

(65) Prior Publication Data
US 2014/0174059 A1 Jun. 26, 2014

(51) Int. Cl.
F01N 3/00 (2006.01)
F01N 3/20 (2006.01)
F01N 11/00 (2006.01)
B60W 20/00 (2006.01)
B60K 6/445 (2007.10)

(52) U.S. Cl.
CPC ............ F01N 3/20 (2013.01); B60W 20/1082 (2013.01); F01N 3/2013 (2013.01); F01N 3/2026 (2013.01); F01N 11/002 (2013.01); B60K 6/445 (2013.01); B60Y 2300/474 (2013.01); F01N 2240/16 (2013.01); F01N 2590/11 (2013.01); F01N 2900/0422 (2013.01); F01N 2900/0601 (2013.01); F01N 2900/1602 (2013.01); Y02T 10/26 (2013.01); Y02T 10/47 (2013.01); Y02T 10/6239 (2013.01); Y10S 903/905 (2013.01)

(58) Field of Classification Search
CPC ............ F01N 2610/02; F01N 2610/03; F01N 3/2066; F01N 3/0842; F01N 3/26; F01N 3/06; F01N 3/38; F01N 3/025; F01N 3/027; F01N 13/02
USPC .............................. 60/286, 303; 422/174, 179
See application file for complete search history.

(56) References Cited

U.S. PATENT DOCUMENTS

| | | | |
|---|---|---|---|
| 2012/0004801 A1* | 1/2012 | Watanabe | 701/22 |
| 2012/0060481 A1* | 3/2012 | Yoshioka et al. | 60/286 |
| 2012/0260638 A1* | 10/2012 | Yoshioka et al. | 60/295 |
| 2012/0323419 A1* | 12/2012 | Hashimoto | 701/22 |
| 2013/0011300 A1* | 1/2013 | Yoshioka et al. | 422/109 |
| 2013/0022513 A1* | 1/2013 | Yoshioka et al. | 422/174 |
| 2014/0292350 A1* | 10/2014 | Yoshioka | 324/551 |
| 2014/0311134 A1* | 10/2014 | Yoshioka | 60/286 |

FOREIGN PATENT DOCUMENTS

| | | | | |
|---|---|---|---|---|
| CN | 102667086 A | 9/2012 | | |
| CN | 102791978 A | 11/2012 | | |
| EP | 2549071 A1 | 1/2013 | | |
| JP | 8-170524 A | 7/1996 | | |
| JP | 9-158718 A | 6/1997 | | |
| JP | 09158718 A | * | 6/1997 | ............ F01N 3/20 |
| JP | 9-250333 A | 9/1997 | | |
| JP | 2010-223159 A | 10/2010 | | |
| JP | 2010223159 A | * | 10/2010 | |
| WO | 2010/109304 A1 | 9/2010 | | |

* cited by examiner

Primary Examiner — Thomas Denion
Assistant Examiner — Patrick Maines
(74) Attorney, Agent, or Firm — Sughrue Mion, PLLC (57) ABSTRACT In a vehicle including an EHC containing a catalyst base material and an insulator insulating the EHC from the outside, an ECU estimates a temperature of the catalyst base material and a temperature of the insulator immediately after a state of the vehicle is switched from a Ready-OFF state to a Ready-ON state, as a base material temperature for determination THcpost and an insulator temperature for determination THipost, respectively. Then, when base material temperature for determination THcpost is lower than a base material threshold temperature THcth and when insulator temperature for determination THipost is lower than an insulator threshold temperature THith, the ECU allows EHC power feed, and otherwise it does not allow but prohibits EHC power feed.

6 Claims, 7 Drawing Sheets

FIG.4 imes # VEHICLE

TECHNICAL FIELD

The present invention relates to a vehicle including a catalytic device which can electrically be heated (Electrical Heated Catalyst, hereinafter also referred to as an "EHC"), for purifying an exhaust from an engine.

BACKGROUND ART

Japanese Patent Laying-Open No. 9-250333 (PTL 1) discloses a technique for estimating a temperature of an EHC from a dead time period of an engine and determining a time period during which power is to be fed to the EHC in accordance with difference between the estimated temperature of the EHC and a target heating temperature in a vehicle including the EHC.

CITATION LIST

Patent Document

PTL 1: Japanese Patent Laying-Open No. 9-250333
PTL 2: Japanese Patent Laying-Open No. 2010-223159
PTL 3: Japanese Patent Laying-Open No. 9-158718
PTL 4: Japanese Patent Laying-Open No. 8-170524

SUMMARY OF INVENTION

Technical Problem

In a case that an EHC is heated with electric power at high voltage, an insulator insulating the EHC from the outside should be provided. When a temperature of the EHC is high, however, an electrical resistance value of the insulator may lower due to overheating and insulating performance may lower. PTL 1, however, is silent about protective control for a case that a temperature of a catalyst is high, and insulating performance may not be ensured.

The present invention was made to solve the problems described above, and an object thereof is to feed power to an EHC while insulating performance of the EHC is ensured.

Solution to Problem

A vehicle according to this invention is a vehicle capable of running with motive power from at least any of a motor and an engine, which includes a power storage device for storing electric power for driving the motor, a catalytic device configured to be able to electrically heat with electric power from the power storage device, a catalyst base material to which a catalyst purifying an exhaust from the engine is fixed, an insulator provided between the catalytic device and a housing accommodating the catalytic device, and a control device controlling power feed to the catalytic device. The control device determines allowance and prohibition of power feed to the catalytic device in accordance with a temperature of the insulator.

Preferably, the control device estimates as an insulator temperature for determination, a temperature of the insulator immediately after the vehicle has switched from a running-disabled state to a running-enabled state, allows power feed to the catalytic device when the insulator temperature for determination is lower than an insulator threshold temperature, and does not allow power feed to the catalytic device when the insulator temperature for determination is equal to or higher than the insulator threshold temperature.

Preferably, the insulator threshold temperature is set to be lower than a temperature calculated by subtracting an amount of increase in temperature of the insulator when power is fed to the catalytic device for a prescribed period of time from an allowable insulator temperature at which insulating performance of the insulator can be ensured.

Preferably, the control device estimates as a base material temperature for determination, a temperature of the catalyst base material immediately after the vehicle has switched from the running-disabled state to the running-enabled state, allows power feed to the catalytic device when the insulator temperature for determination is lower than the insulator threshold temperature and when the base material temperature for determination is lower than a base material threshold temperature, and does not allow power feed to the catalytic device in at least any of a case that the insulator temperature for determination is equal to or higher than the insulator threshold temperature and a case that the base material temperature for determination is equal to or higher than the base material threshold temperature.

Preferably, the base material threshold temperature is set to be lower than a temperature calculated by subtracting an amount of increase in temperature of the catalyst base material when power is fed to the catalytic device for a prescribed period of time from an allowable base material temperature at which damage to the catalyst base material can be prevented.

Preferably, the control device causes a temperature of the insulator and a temperature of the catalyst base material immediately before the vehicle switches from the running-enabled state to the running-disabled state to be stored as an initial insulator temperature and an initial base material temperature, respectively. The control device counts a dead time period from switch of the vehicle to the running-disabled state until next switch to the running-enabled state. The control device estimates the insulator temperature for determination by using the initial insulator temperature and the dead time period and estimates the base material temperature for determination by using the initial base material temperature and the dead time period, immediately after the vehicle has switched to the running-enabled state.

Advantageous Effects of Invention

According to the present invention, power can be fed to the EHC while insulating performance of the EHC is ensured.

DESCRIPTION OF EMBODIMENTS

An embodiment of the present invention will be described hereinafter in detail with reference to the drawings. It is noted that the same or corresponding elements in the drawings have the same reference characters allotted and description thereof will not be repeated.

Figure 1:
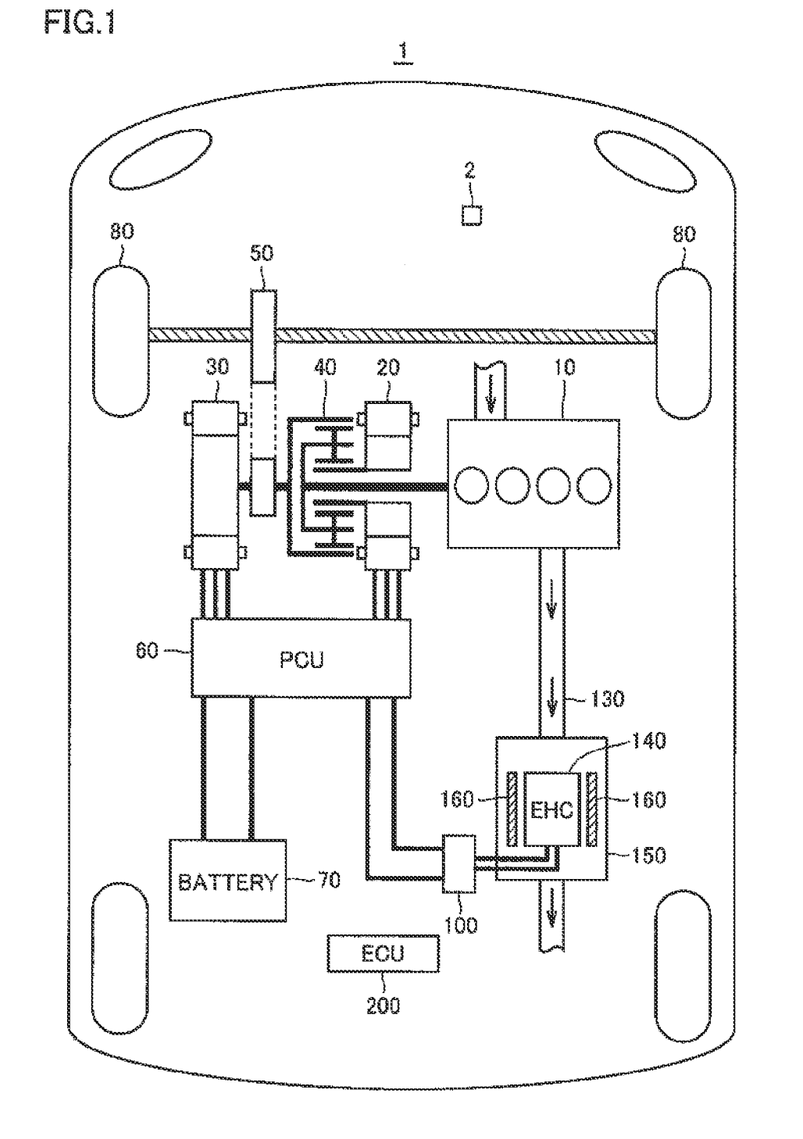
FIG. 1 is an overall block diagram of a vehicle.

FIG. 1 is an overall block diagram of a vehicle 1 according to the present embodiment. Vehicle 1 includes an engine 10, a first MG (Motor Generator) 20, a second MG 30, a power split device 40, a reduction gear 50, a power control unit (hereinafter referred to as a "PCU") 60, a battery 70, a drive wheel 80, and an electronic control unit (hereinafter referred to as an "ECU") 200.

Engine 10 is an internal combustion engine generating driving force for rotating a crankshaft with combustion energy produced at the time when an air-fuel mixture burns. First MG 20 and second MG 30 are motor generators driven with an alternating current.

Vehicle 1 runs with motive power output from at least one of engine 10 and second MG 30. Driving force produced by engine 10 is split into two paths by power split device 40. Namely, one is a path for transmission to drive wheel 80 through reduction gear 50, and another is a path for transmission to first MG 20.

Power split device 40 is made up of a planetary gear including a sun gear, a pinion gear, a carrier, and a ring gear. The pinion gear is engaged with the sun gear and the ring gear. The carrier revolvably supports the pinion gear and it is coupled to the crankshaft of engine 10. The sun gear is coupled to a rotation shaft of first MG 20. The ring gear is coupled to a rotation shaft of second MG 30 and reduction gear 50.

PCU 60 is controlled by a control signal from ECU 200. PCU 60 converts DC power supplied from battery 70 to AC power capable of driving first MG 20 and second MG 30. PCU 60 outputs resultant AC power to first MG 20 and second MG 30. Thus, first MG 20 and second MG 30 are driven with electric power stored in battery 70. It is noted that PCU 60 can also convert AC power generated by first MG 20 and second MG 30 to DC power, and charge battery 70 with resultant DC power.

Battery 70 is a DC power supply storing electric power for driving first MG 20 and second MG 30, and implemented, for example, by such a secondary battery as a nickel metal hydride battery or a lithium ion battery. An output voltage from battery 70 is a voltage, for example, as high as around 200 V. It is noted that a large-capacity capacitor can also be adopted instead of battery 70.

In addition, vehicle 1 includes an ignition switch (hereinafter referred to as an "IG switch") 2 IG switch 2 is a switch for a user to switch a state of vehicle 1 between a running-enabled state (hereinafter also referred to as a "Ready-ON state") and a running-disabled state (hereinafter also referred to as a "Ready-OFF state").

It is noted that, in the Ready-ON state, an SMR 71 (see FIG. 2) is closed so that battery 70 and PCU 60 are electrically connected to each other. On the other hand, in the Ready-OFF state, SMR 71 is opened so that battery 70 and PCU 60 are disconnected from each other.

When the user presses IG switch 2 in the Ready-OFF state, an IG on signal is output from IG switch 2 to ECU 200. On the other hand, when the user presses IG switch 2 in the Ready-ON state, an IG off signal is output from IG switch 2 to ECU 200. ECU 200 switches between the Ready-ON state and the Ready-OFF state in response to a signal from IG switch 2.

Vehicle 1 further includes an exhaust passage 130. An exhaust gas exhausted from engine 10 is exhausted to the atmosphere through exhaust passage 130.

At some point of exhaust passage 130, an electrical heated catalyst (hereinafter referred to as an "EHC") 140 is provided. EHC 140 is constituted of a catalyst base material to which a catalyst made of a precious metal, for purifying an exhaust gas from engine 10, is fixed (carried), and an electric heater for electrically heating the catalytic base material through power feed. EHC 140 consumes electric power of a large capacity (electric power at high voltage) supplied from battery 70 through PCU 60 and increases a temperature of a catalyst to an active temperature. It is noted that various known EHCs can be applied as EHC 140.

EHC 140 is accommodated in a muffler case (a housing) 150. As described above, since electric power at high voltage is supplied to EHC 140, an insulator 160 insulating EHC 140 from the outside is provided between EHC 140 and housing 150. Insulator 160 is arranged to cover EHC 140. As EHC 140 is heated, heat conducted from EHC 140 heats also insulator 160.

ECU 200 contains a CPU (Central Processing Unit) and a memory which are not shown, and it is configured to perform prescribed operation processing based on information stored in the memory.

Figure 2:
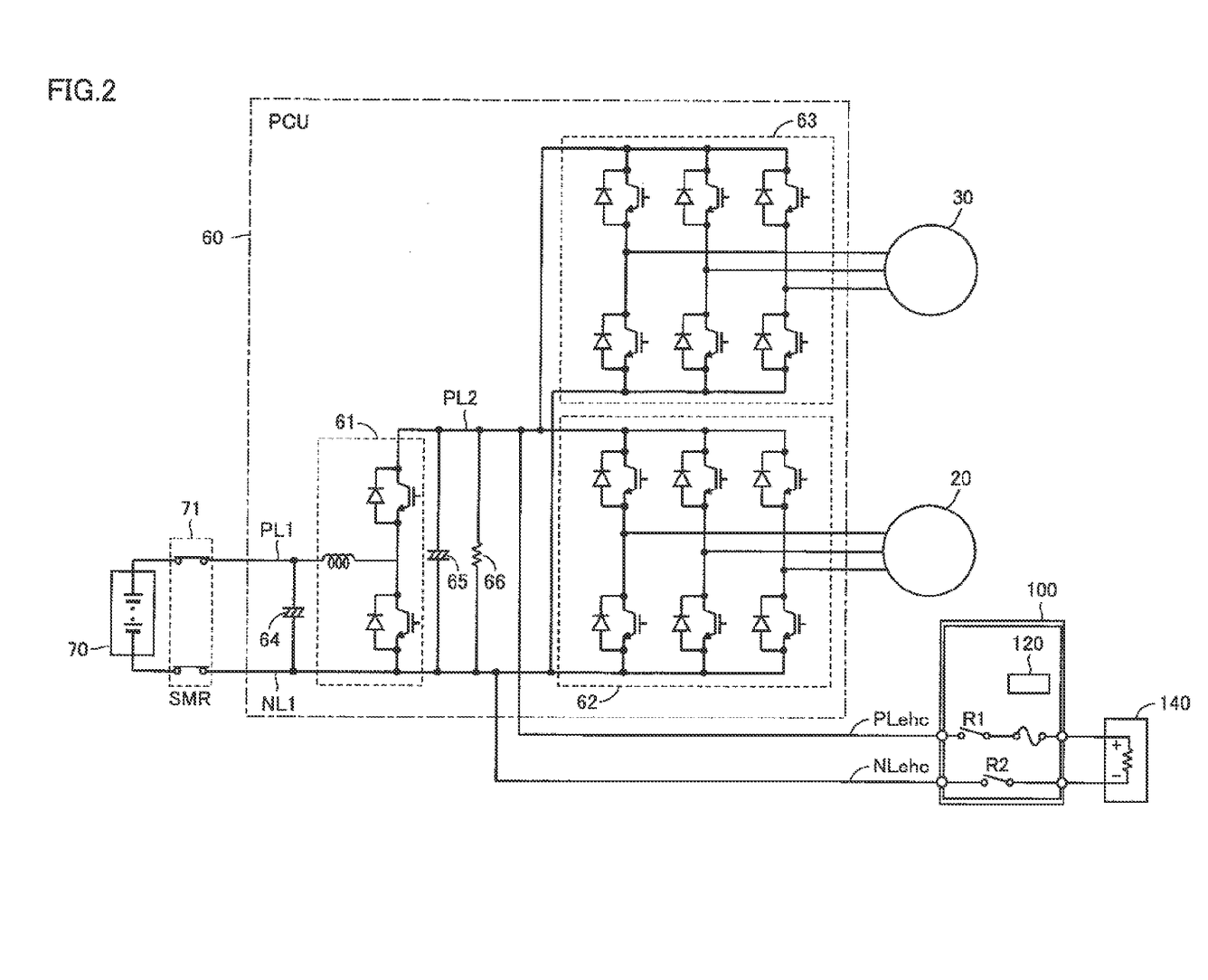
FIG. 2 is a circuit configuration diagram of a first MG, a second MG, a PCU, a battery, and an EHC.

FIG. 2 is a circuit configuration diagram of first MG 20, second MG 30, PCU 60, battery 70, and EHC 140.

A system main relay (SMR) 71 is provided between PCU 60 and battery 70. SMR 71 is controlled by a control signal from ECU 200 and switches between connection and disconnection between battery 70 and PCU 60.

PCU 60 includes a converter 61, inverters 62, 63, smoothing capacitors 64, 65, and a discharge resistor 66.

Converter 61 is connected to battery 70 through a positive electrode line PL1 and a negative electrode line NL1. In addition, converter 61 is connected to inverters 62, 63 through a positive electrode line PL2 and negative electrode line NL1.

Converter 61 includes a reactor, two switching elements, and two diodes. Converter 61 is controlled by a control signal from ECU 200 and converts a voltage between battery 70 and inverters 62, 63.

Inverter 62 is provided between converter 61 and first MG 20. Inverter 63 is provided between converter 61 and second MG 30. Inverters 62, 63 are connected in parallel to converter 61.

Each of inverters 62, 63 includes upper and lower arms of three phases (switching elements) and diodes connected in anti-parallel to respective switching elements. The upper and lower arms of inverters 62, 63 are controlled by a control signal from ECU 200, and they convert DC power of which voltage has been converted by converter 61 to AC power and output resultant AC power to first MG 20 and second MG 30.

Smoothing capacitor 64 is connected between positive electrode line PL1 and negative electrode line NL1, and smoothes an AC component in voltage fluctuation between positive electrode line PL1 and negative electrode line NL1. Smoothing capacitor 65 is connected between positive electrode line PL2 and negative electrode line NL1, and smoothes an AC component in voltage fluctuation between positive electrode line PL2 and negative electrode line NL1.

Discharge resistor 66 is connected between positive electrode line PL2 and negative electrode line NL1. Discharge resistor 66 serves to release residual charges in smoothing capacitors 64, 65.

EHC 140 is connected to a power line (positive electrode line PL2, negative electrode line NL1) between converter 61 and inverters 62, 63 within PCU 60. More specifically, EHC 140 has one end connected to a positive electrode branch line PLehc branched from positive electrode line PL2 and the other end connected to a negative electrode branch line NLehc branched from negative electrode line NL1.

A switch 100 is provided between EHC 140 and PCU 60. Switch 100 contains an EHC relay R1 provided on positive electrode branch line PLehc, an EHC relay R2 provided on negative electrode branch line NLehc, and a monitoring sensor 120. Opening and closing of each EHC relay R1, R2 is controlled by a control signal from ECU 200. Monitoring sensor 120 monitors a state of power feed to EHC 140 (such as an applied voltage, a fed current, and a time period of power feed). It is noted that monitoring sensor 120 may be located outside switch 100 Alternatively, if another existing sensor can monitor a state of power feed to EHC 140, monitoring sensor 120 does not have to be provided.

As EHC relays R1, R2 are closed, electric power at high voltage after an output voltage from battery 70 is boosted by converter 61 is supplied to the electric heater for EHC 140. Hereinafter, such a state is also referred to as "EHC power feed." This EHC power feed electrically heats the catalyst base material of EHC 140. On the other hand, as EHC relays R1, R2 are opened, EHC 140 is disconnected from PCU 60 and EHC power feed is cut off.

Figure 3:
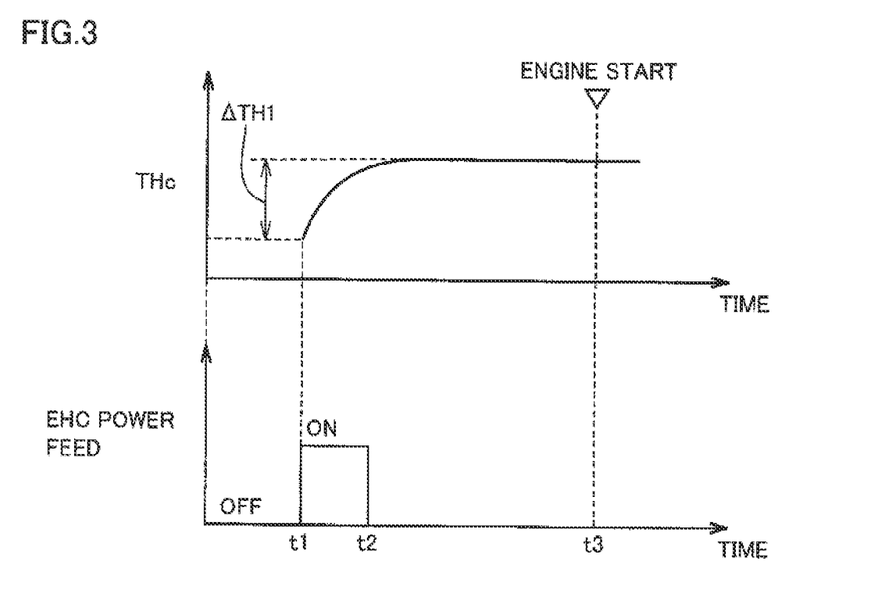
FIG. 3 is a diagram showing one example of a method for feeding power to the EHC by means of an ECU.

FIG. 3 is a diagram showing one example of a method of EHC power feed by means of ECU 200. In starting engine 10, ECU 200 causes power feed to the EHC by closing EHC relays R1, R2 for a prescribed period of time from time t1 to time t2, in order to raise a temperature of a catalyst of EHC 140 to an active temperature in advance. Single (one shot of) EHC power feed increases a base material temperature of EHC 140 (hereinafter simply referred to as a "base material temperature THc") by a prescribed temperature $\Delta TH1$. Then, at subsequent time t3, engine 10 is started.

In vehicle 1 having a structure as above, high-voltage battery 70 storing electric power for driving first MG 20 and second MG 30 is shared as a power supply for EHC 140, so that early temperature increase in catalyst is realized at low cost. With such a configuration, since electric power at high voltage is supplied to EHC 140, insulator 160 insulating EHC 140 from the outside should be provided as described above. An electrical resistance value of insulator 160, however, tends to lower due to overheating. Therefore, for example, when EHC 140 is heated again while a temperature of EHC 140 is maintained at a high temperature by residual heat, insulator 160 enters an overheated state and insulating performance thereof may lower.

Then, in the present embodiment, a temperature of insulator 160 (hereinafter referred to as an "insulator temperature THi") is accurately estimated, and allowance and prohibition of EHC power feed is determined based on estimated insulator temperature THi, so that insulating performance of insulator 160 is ensured. This is the most characteristic feature of the present embodiment.

Figure 4:
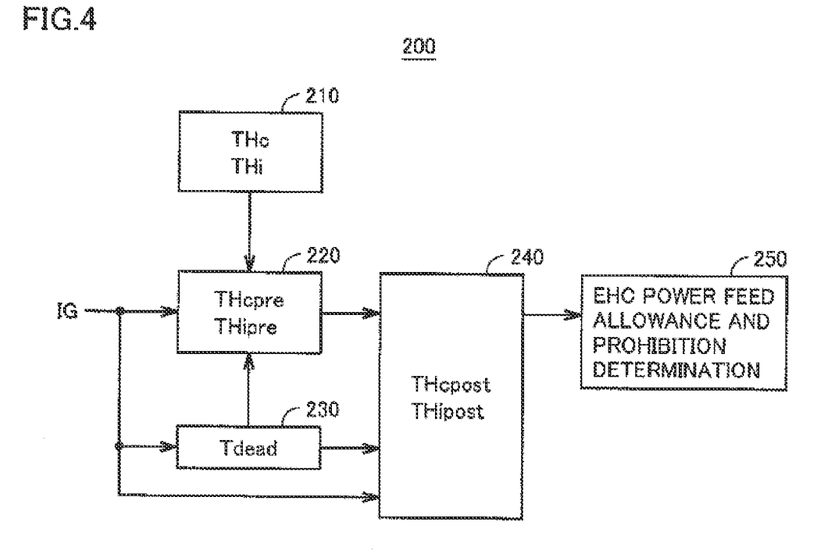
FIG. 4 is a functional block diagram of the ECU.

FIG. 4 is a functional block diagram of ECU 200 in determining allowance and prohibition of EHC power feed. Each functional block shown in FIG. 4 may be implemented by hardware or software.

ECU 200 includes an estimation portion 210, a storage portion 220, a counting portion 230, an estimation portion 240, and a determination portion 250.

Estimation portion 210 estimates base material temperature THc and insulator temperature THi in the Ready-ON state, for example, from results of detection by monitoring sensor 120.

When storage portion 220 receives the IG off signal from IG switch 2 in the Ready-ON state, it obtains base material temperature THc and insulator temperature THi at the time of reception of the IG off signal (that is, immediately before switch from the Ready-ON state to the Ready-OFF state) from estimation portion 210 and stores them as an "initial base material temperature THcpre" and an "initial insulator temperature THipre," respectively.

When counting portion 230 receives the TG off signal from IG switch 2, it counts time from switch from the Ready-ON state to the Ready-OFF state until next switch to the Ready-ON state as a "dead time period Tdead."

When estimation portion 240 receives the IG on signal from IG switch 2, it estimates base material temperature THc and insulator temperature THi immediately after reception of the IG on signal (that is, immediately after switch from the Ready-OFF state to the Ready-ON state) as a "base material temperature for determination THcpost" and an "insulator temperature for determination THipost," respectively.

Estimation portion 240 obtains dead time period Tdead from counting portion 230, and uses a map showing cooling characteristics (temperature lowering characteristics) of EHC 140 and insulator 160 obtained in advance through experiments or the like to thereby estimate a base material temperature lowering amount $\Delta THc$ and an insulator temperature lowering amount $\Delta THi$ corresponding to dead time period Tdead. Then, estimation portion 240 estimates base material temperature for determination THcpost and insulator temperature for determination THipost by using Equations (1) and (2) below.

$$THcpost = THcpre - \Delta THc \quad (1)$$

$$THcpost = THipre - \Delta THi \quad (2)$$

Determination portion 250 determines allowance and prohibition of EHC power feed, by using base material temperature for determination THcpost and insulator temperature for determination THipost. Specifically, determination portion 250 allows EHC power feed when base material temperature for determination THcpost is lower than a base material threshold temperature THcth and when insulator temperature for determination THipost is lower than an insulator threshold temperature THith.

It is noted that, in a case that EHC power feed is allowed, at the time point when a prescribed power feed condition is satisfied, EHC relays R1, R2 are closed and EHC power feed is carried out. In addition, in the present embodiment, it is assumed that EHC power feed is carried out once in one trip (a period from switch to the Ready-ON state until next switch to the Ready-OFF state).

On the other hand, in at least any of a case that base material temperature for determination THcpost is equal to or higher than base material threshold temperature THcth and a case that insulator temperature for determination THipost is equal to or higher than insulator threshold temperature THith, determination portion 250 does not allow but prohibits EHC power feed.

It is noted that, when EHC power feed is prohibited, EHC relays R1, R2 are maintained in an opened state and EHC power feed is not carried out until that trip ends or until at least base material temperature THc and insulator temperature THi are lower than base material threshold temperature THcth and insulator threshold temperature THith, respectively.

Here, base material threshold temperature THcth is set to be lower than a temperature calculated by subtracting a base material temperature increase amount $\Delta TH1$ resulting from single EHC power feed from an upper limit temperature at which damage to the catalyst base material can be prevented (hereinafter referred to as an "allowable base material temperature THcmax"). In other words, between base material threshold temperature THcth and allowable base material temperature THcmax, a margin exceeding base material temperature increase amount ΔTH1 resulting from single EHC power feed is set. Therefore, even though EHC power feed is carried out once while base material temperature THc is lower than base material threshold temperature THcth, base material temperature THc does not reach allowable base material temperature THcmax.

Similarly, insulator threshold temperature THith is set to be lower than a temperature calculated by subtracting an insulator temperature increase amount ΔTH2 resulting from single EHC power feed from an upper limit value at which insulating performance of insulator 160 can be ensured (hereinafter referred to as an "allowable insulator temperature THimax"). In other words, between insulator threshold temperature THith and allowable insulator temperature THimax, a margin exceeding insulator temperature increase amount ΔTH2 resulting from single EHC power feed is set. Therefore, even though EHC power feed is carried out once while insulator temperature THi is lower than insulator threshold temperature THith, insulator temperature THi does not reach allowable insulator temperature THimax.

Figure 5:
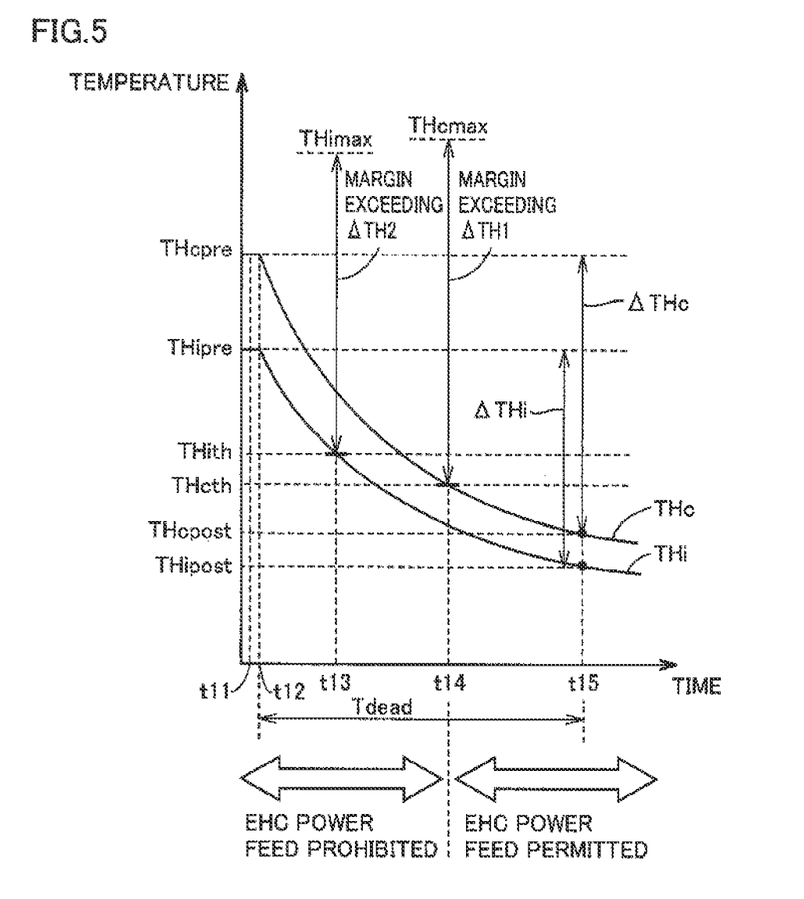
FIG. 5 is a diagram showing one example of change over time in a base material temperature THc and an insulator temperature THi.

FIG. 5 is a diagram showing one example of change over time in base material temperature THc and insulator temperature THi. A method of determining whether or not EHC power feed is allowed by ECU 200 will be described with reference to FIG. 5.

As ECU 200 receives the TG off signal at time t11 when the Ready-ON state has been set, it causes base material temperature THc and insulator temperature THi at time t11 to be stored as initial base material temperature THcpre and initial insulator temperature THipre, respectively.

When switch to the Ready-OFF state is made at subsequent time t12, counting of dead time period Tdead is started.

As time elapses, base material temperature THc and insulator temperature THi gradually lower. In the example shown in FIG. 5, at time t13 and later, insulator temperature THi is lower than insulator threshold temperature THith, and a state that insulating performance can be ensured even though ECU power feed is performed once (a state that insulator temperature THi does not exceed allowable base material temperature THcmax) is established. Then, at time t14 and later, base material temperature THc is lower than base material threshold temperature THcth, and a state that the catalyst base material can be protected even though ECU power feed is carried out once (a state that base material temperature THc does not exceed allowable base material temperature THcmax) is established. Therefore, at time t14 and later, ensured insulation and protection of the base material can both be achieved even though EHC power feed is carried out once. In the present embodiment, such a state is defined as a state that EHC power feed can be carried out.

When ECU 200 receives the IG on signal at time t15, ECU 200 estimates base material temperature for determination THcpost and insulator temperature for determination THipost by using Equations (1) and (2) described above, from initial base material temperature THcpre, initial insulator temperature THipre, and dead time period Tdead. Then, in the example shown in FIG. 5, since base material temperature for determination THcpost is lower than base material threshold temperature THcth and insulator temperature for determination THipost is lower than insulator threshold temperature THith at time t15, EHC power feed is allowed.

Figure 6:
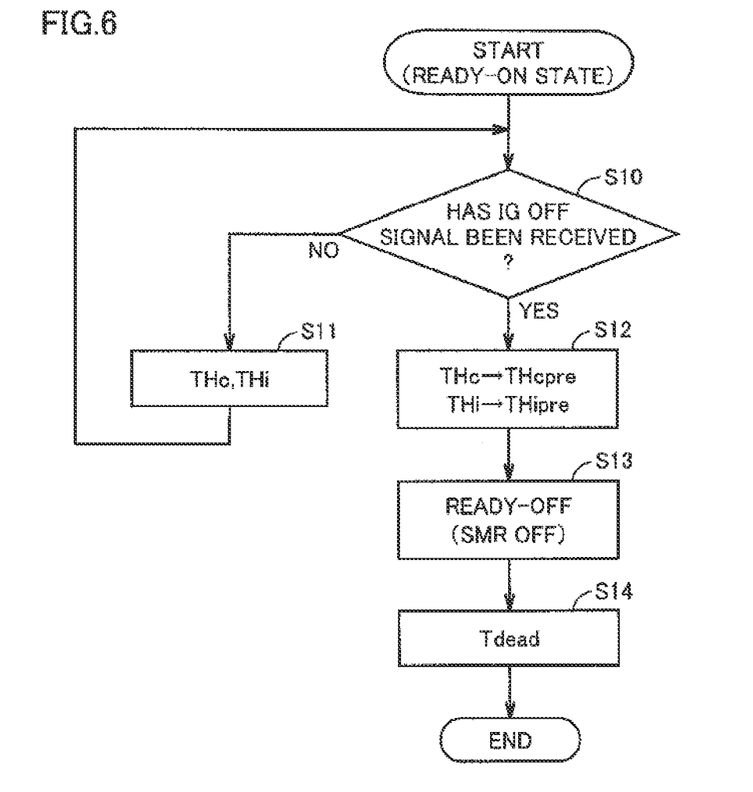
FIG. 6 is a flowchart (No. 1) showing a processing procedure in the ECU.

FIG. 6 is a flowchart showing a processing procedure in ECU 200 for realizing functions of estimation portion 210, storage portion 220, and counting portion 230 described above. The flowchart shown in FIG. 6 is repeatedly executed in a prescribed cycle in the Ready-ON state.

In step (hereinafter a step being abbreviated as "S") 10, ECU 200 determines whether or not the IG off signal has been received.

When the IG off signal has not been received (NO in S10), ECU 200 estimates in S11, base material temperature THc and insulator temperature THi in the Ready-ON state, for example, from results of detection by monitoring sensor 120.

On the other hand, when the IG off signal has been received (YES in S10), ECU 200 causes in S12, base material temperature THc and insulator temperature THi at the time of reception of the IG off signal to be stored as initial base material temperature THcpre and initial insulator temperature THipre, respectively.

Thereafter, ECU 200 opens SMR 71 in S13 to thereby set the Ready-OFF state, and starts counting of dead time period Tdead in S14. It is noted that counting of dead time period Tdead is continued until next switch to the Ready-ON state.

Figure 7:
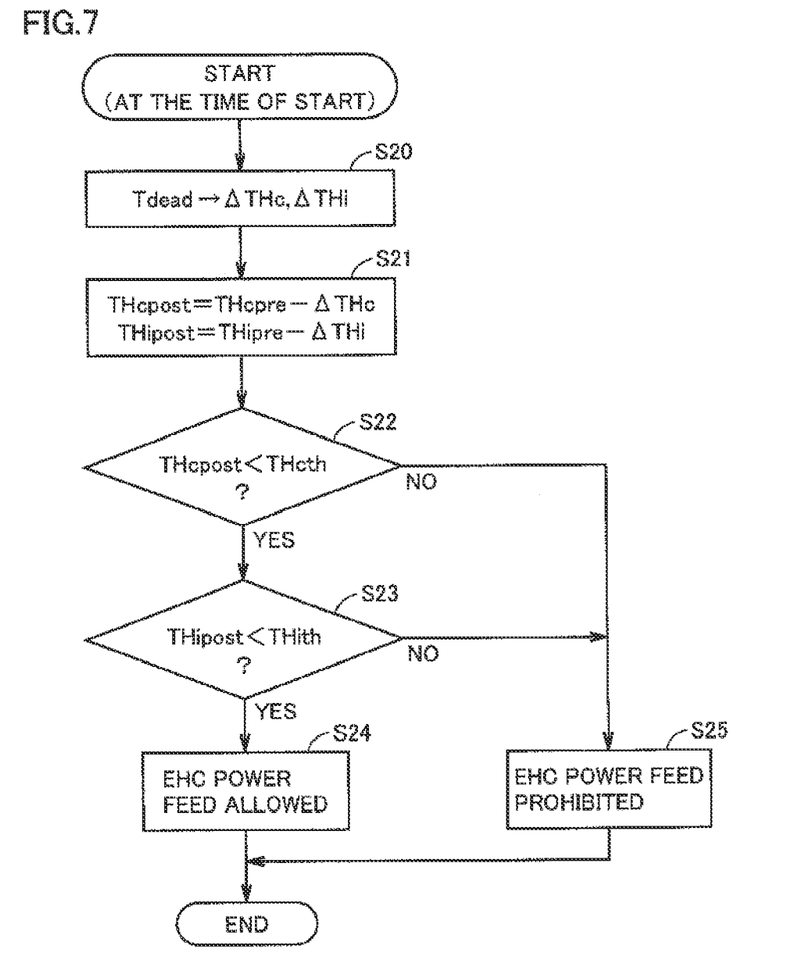
FIG. 7 is a flowchart (No. 2) showing a processing procedure in the ECU.

FIG. 7 is a flowchart showing a processing procedure in ECU 200 for realizing functions of estimation portion 240 and determination portion 250 described above. The flowchart shown in FIG. 7 is executed at the time when ECU 200 is started up (at the time of switch from the Ready-OFF state to the Ready-ON state).

In S20, ECU 200 estimates base material temperature lowering amount ΔTHc and insulator temperature lowering amount ΔTHi corresponding to dead time period Tdead.

In S21, ECU 200 estimates base material temperature for determination THcpost and insulator temperature for determination THipost by using Equations (1) and (2) described above.

In S22, ECU 200 determines whether or not base material temperature for determination THcpost is lower than base material threshold temperature THcth.

In S23, ECU 200 determines whether or not insulator temperature for determination THipost is lower than insulator threshold temperature THith.

When base material temperature for determination THcpost is lower than base material threshold temperature THcth (YES in S22) and when insulator temperature for determination THipost is lower than insulator threshold temperature THith (YES in S23), ECU 200 allows EHC power feed.

On the other hand, in at least any of a case that base material temperature for determination THcpost is equal to or higher than base material threshold temperature THcth (NO in S22) and a case that insulator temperature for determination THipost is equal to or higher than insulator threshold temperature THith (NO in S23), ECU 200 does not allow but prohibits EHC power feed.

As above, ECU 200 according to the present embodiment estimates insulator temperature for determination THipost immediately after next switch to the Ready-ON state, from initial insulator temperature THipre immediately before switch to the Ready-OFF state and dead time period Tdead which is a duration of the Ready-OFF state. Then, when insulator temperature for determination THipost is lower than insulator threshold temperature THith, ECU 200 allows EHC power feed, and otherwise it prohibits EHC power feed. Therefore, EHC power feed can be carried out by using electric power at high voltage from battery 70 while insulating performance of EHC 140 is ensured. In addition, by applying the present invention, an insulator relatively low in an allowable temperature can be adopted as insulator 160, and thus reduction in cost of insulator 160 can also be achieved.

Furthermore, in the present embodiment, not only insulating performance of EHC 140 is ensured but also the catalyst base material can be protected. Namely, when insulator temperature for determination THipost is lower than insulator threshold temperature THith and when base material temperature for determination THcpost is lower than base material threshold temperature THcth, ECU 200 according to the present embodiment allows EHC power feed, and otherwise it prohibits EHC power feed. Therefore, not only insulating performance of EHC 140 is ensured but also the catalyst base material can be protected.

Though allowance and prohibition of EHC power feed has been determined based on both of base material temperature THc and insulator temperature THi in the present embodiment, allowance and prohibition of EHC power feed may be determined only based on insulator temperature THi.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 vehicle; 2 IG switch; 10 engine; 20 first MG; 30 second MG; 40 power split device; 50 reduction gear; 60 PCU; 61 converter; 62, 63 inverter; 64, 65 smoothing capacitor; 66 discharge resistor; 70 battery; 80 drive wheel; 100 switch; 120 monitoring sensor; 130 exhaust passage; 150 housing; 160 insulator; 200 EUC; 210, 240 estimation portion; 220 storage portion; 230 counting portion; 250 determination portion; NL1 negative electrode line; NLehc negative electrode branch line; PL1, PL2 positive electrode line; PLehc positive electrode branch line; and R1, R1 EHC relay.

The invention claimed is:

1. A vehicle capable of running with motive power from at least any of a motor and an engine, comprising:
   a power storage device for storing electric power for driving said motor;
   a catalytic device configured to be able to electrically heat with electric power from said power storage device, a catalyst base material to which a catalyst purifying exhaust from said engine is fixed;
   an insulator provided between said catalytic device and a housing accommodating said catalytic device; and
   a control device controlling a power feed to said catalytic device,
   said control device determining an allowance and prohibition of the power feed to said catalytic device in accordance with a temperature of said insulator.

2. The vehicle according to claim 1, wherein
said control device estimates as an insulator temperature for determination, a temperature of said insulator immediately after said vehicle has switched from a running-disabled state to a running-enabled state, allows the power feed to said catalytic device when said insulator temperature for determination is lower than an insulator threshold temperature, and does not allow the power feed to said catalytic device when said insulator temperature for determination is equal to or higher than said insulator threshold temperature.

3. The vehicle according to claim 2, wherein
said insulator threshold temperature is set to be lower than a temperature calculated by subtracting an amount of increase in temperature of said insulator when power is fed to said catalytic device for a prescribed period of time from an allowable insulator temperature at which an insulating performance of said insulator is ensured.

4. The vehicle according to claim 2, wherein
said control device estimates as a base material temperature for determination, a temperature of said catalyst base material immediately after said vehicle has switched from said running-disabled state to said running-enabled state, allows the power feed to said catalytic device when said insulator temperature for determination is lower than said insulator threshold temperature and when said base material temperature for determination is lower than a base material threshold temperature, and does not allow the power feed to said catalytic device in at least any of a case that said insulator temperature for determination is equal to or higher than said insulator threshold temperature and a case that said base material temperature for determination is equal to or higher than said base material threshold temperature.

5. The vehicle according to claim 4, wherein
said base material threshold temperature is set to be lower than a temperature calculated by subtracting an amount of increase in temperature of said catalyst base material when power is fed to said catalytic device for a prescribed period of time from an allowable base material temperature at which damage to said catalyst base material is prevented.

6. The vehicle according to claim 4, wherein
said control device causes a temperature of said insulator and a temperature of said catalyst base material immediately before said vehicle switches from said running-enabled state to said running-disabled state to be stored as an initial insulator temperature and an initial base material temperature, respectively, counts a dead time period from a switch of said vehicle to said running-disabled state until a next switch to a running-enabled state, and estimates said insulator temperature for determination by using said initial insulator temperature and said dead time period and estimates said base material temperature for determination by using said initial base material temperature and said dead time period, immediately after said vehicle has switched to said running-enabled state.

* * * * *